US010798625B2

(12) United States Patent
Viox et al.

(10) Patent No.: US 10,798,625 B2
(45) Date of Patent: Oct. 6, 2020

(54) DIGITAL MEDIA DELIVERY

(71) Applicant: AT&T Mobility II LLC, Atlanta, GA (US)

(72) Inventors: Alexander Viox, Atlanta, GA (US); Iftekhar Alam, Atlanta, GA (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 106 days.

(21) Appl. No.: 15/918,450

(22) Filed: Mar. 12, 2018

(65) Prior Publication Data

US 2019/0281516 A1 Sep. 12, 2019

(51) Int. Cl.
*H04W 36/02* (2009.01)
*H04W 36/08* (2009.01)
*H04W 36/00* (2009.01)
*H04W 4/06* (2009.01)

(52) U.S. Cl.
CPC .......... *H04W 36/026* (2013.01); *H04W 4/06* (2013.01); *H04W 36/0011* (2013.01); *H04W 36/08* (2013.01); *H04W 36/0007* (2018.08)

(58) Field of Classification Search
USPC ....................................................... 370/331
See application file for complete search history.

(56) References Cited

U.S. PATENT DOCUMENTS

| 7,369,825 | B2 | 5/2008 | Slupe et al. |
| 8,780,778 | B2 | 7/2014 | Evans et al. |
| 8,862,048 | B2 | 10/2014 | Devine et al. |
| 8,918,088 | B1 | 12/2014 | Muthuswamy et al. |
| 9,059,830 | B2 | 6/2015 | Li et al. |
| 9,305,308 | B2 | 4/2016 | Smereka et al. |
| 9,338,715 | B1 * | 5/2016 | Sevindik ............... H04W 76/40 |
| 9,652,461 | B2 * | 5/2017 | Link, II ............ G08G 1/096741 |
| 9,819,777 | B1 | 11/2017 | Alam et al. |
| 9,913,249 | B2 * | 3/2018 | Gupta .................... H04W 68/02 |
| 2009/0122749 | A1 | 5/2009 | Byun et al. |
| 2010/0067490 | A1 * | 3/2010 | Chiu ................... H04L 12/1877 370/331 |

(Continued)

OTHER PUBLICATIONS

3GPP, "3rd Generation Partnership Project; Technical Specification Group Services and System Aspects; Multimedia Broadcast/Multicast Service (MBMS); Architecture and functional description (Release 14)", 3GPP TS 23.246 V14.0.0 (Sep. 2016), 76pp.

*Primary Examiner* — Alpus Hsu
*Assistant Examiner* — Hooman Houshmand
(74) *Attorney, Agent, or Firm* — Guntin & Gust, PLC; Jay Anderson

(57) ABSTRACT

Aspects of the subject disclosure may include, for example, a method comprising receiving first media content from first equipment of a first source, transmitting the first media content to a first base station having a first coverage area for transmission from the first base station to a user device through multi-cast while the user device is within the first coverage area, and transmitting the first media content to a second base station having a second coverage area for transmission from the second base station to the user device through unicast while the user device is within the second coverage area. Other embodiments are disclosed.

20 Claims, 7 Drawing Sheets

(56) References Cited

U.S. PATENT DOCUMENTS

| | | | |
|---|---|---|---|
| 2012/0236776 A1* | 9/2012 | Zhang | H04W 48/12 370/312 |
| 2012/0263089 A1* | 10/2012 | Gupta | H04W 72/005 370/312 |
| 2013/0102241 A1 | 4/2013 | Devine et al. | |
| 2013/0111520 A1* | 5/2013 | Lo | H04L 67/306 725/35 |
| 2013/0294321 A1* | 11/2013 | Wang | H04W 4/06 370/312 |
| 2015/0208209 A1* | 7/2015 | Jamadagni | H04W 4/06 370/312 |
| 2016/0173388 A1* | 6/2016 | Alam | H04L 65/4076 709/219 |
| 2017/0013421 A1* | 1/2017 | Kodaypak | H04W 4/06 |
| 2017/0279551 A1 | 9/2017 | Husmann et al. | |
| 2019/0253836 A1* | 8/2019 | Sinha | H04W 4/023 |

* cited by examiner

*PRIOR ART*

100

200

300

DIGITAL MEDIA DELIVERY

FIELD OF THE DISCLOSURE

The subject disclosure relates to a method and system of digital media delivery.

BACKGROUND

Many drivers listen to radio, either Frequency Modulation (FM), Amplitude Modulation (AM), or satellite-based radio. Many listeners only listen to a particular radio station each time they are in their vehicle. However, FM/AM radio has a limited footprint and a listener may lose reception when traveling from one area to another. Further, satellite can have holes in urban areas caused by blockage by building and other obstructions. Many of these same issues are experienced with other forms of media, such as television.

Recent trends in wireless mobile networks are adopting point-to-multipoint services, in which data is transmitted from a single source entity to multiple recipients. Transmitting the same data to multiple recipients allows network resources, including the scarce radio spectrum, to be shared. One such example includes an LTE broadcast service, referred to as an evolved Multimedia Broadcast/Multicast service (eMBMS), disclosed in 3GPP TS 23.246, incorporated herein by reference in its entirety.

In particular, MBMS is a point-to-multipoint service providing a broadcast mode, in which a unidirectional point-to-multipoint transmission of data is established from a single source entity to all users in a broadcast service area. The MBMS also includes a multicast mode, in which a unidirectional point-to-multipoint transmission of data from a single source point to a multicast group in a multicast service area. Multicast mode can include a possibility for the network to selectively transmit to cells within the multicast service area which contain members of a multicast group.

FIG. 1 depicts an illustrative embodiment of reference architecture 100 to support a Multimedia Broadcast/Multicast (MBMS) bearer service with eUTRAN and UTRAN. FIG. 1 was obtained from 3GPP TS 23.246. The wireless network 100 include radio access network (E-UTRAN) 102 that communicates wirelessly with mobile devices 104a. The reference architecture 100 includes a Broadcast Multicast Service Center (BM-SC) 108, a Multimedia Broadcast/Multicast Service Gateway (MBMS GW) 110, a Mobility Management Entity (MME) 112, and a combined Packet Data Network (PDN) gateway 114. Such architecture 100 may also support an evolved Multimedia Broadcast/Multicast (eMBMS) connection and/or unicast connection to the mobile devices 104a.

BRIEF DESCRIPTION OF THE DRAWINGS

Reference will now be made to the accompanying drawings, which are not necessarily drawn to scale, and wherein.

DETAILED DESCRIPTION

Figure 1:
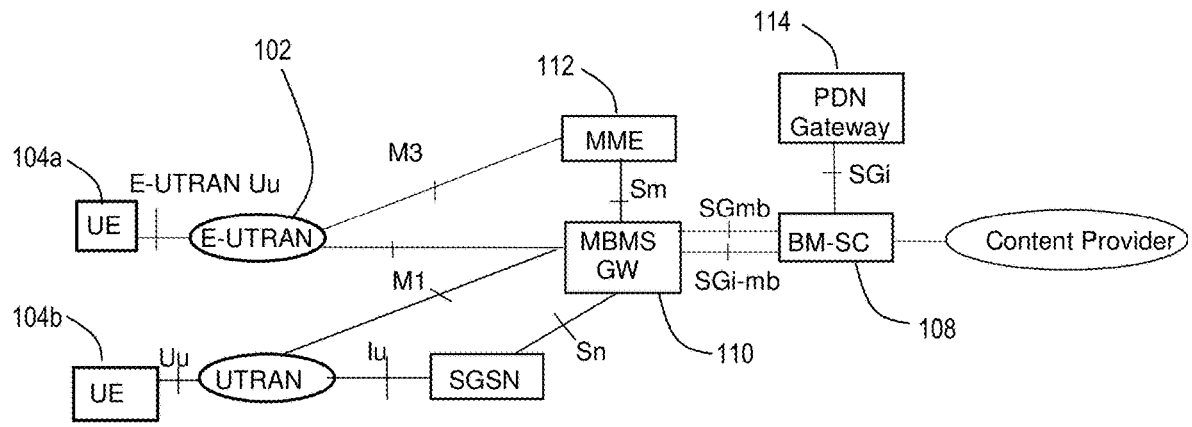
FIG. 1 depicts an illustrative functional block diagram of a portion of a prior art multicast/broadcast mobile network.

The subject disclosure describes, among other things, illustrative embodiments for efficiently providing a variety of media content overcoming the limitations of traditional broadcast and other techniques. Other embodiments are described in the subject disclosure.

One or more aspects of the subject disclosure include transmitting media content to a user using multi-cast, such as evolved Multimedia Broadcast/Multicast (eMBMS), when the user is in a first, or local, area and transmitting the media to the user using unicast, when the user is in a second, or remote, area.

One or more aspects of the subject disclosure include efficiently providing a user with selected media content regardless of their location.

One or more aspects of the subject disclosure include efficiently providing a user with a selected type or genre of media content regardless of their location.

One or more aspects of the subject disclosure include targeting advertising to appropriate geographical areas.

One or more aspects of the subject disclosure include a method comprising: receiving media content from a first source; transmitting the media content to a first base station having a first coverage area for transmission from the first base station to a user device through eMBMS while the user device is within the first coverage area; and transmitting, by the processing system, the first media content to a second base station having a second coverage area for transmission from the second base station to the user device through unicast while the user device is within the second coverage area.

One or more aspects of the subject disclosure include a storage device having computer instructions which, responsive to being executed by a processor, cause the processor to obtain first media content; send the first media content to a first base station having a first coverage area for transmission to a user device through multicast while the user device is within the first coverage area; and send the first media content to a second base station having a second coverage area for transmission to the user device through unicast while the user device is within the second coverage area.

One or more aspects of the subject disclosure include a communications system comprising: a processing system; a first communications connection to a first source, the first connection being configured for obtaining first media content from the first source; a first base station having a first coverage area; a second communications connection to the first base station, for sending the first media content from the processing system to the first base station for transmission to a user within the first coverage area through multicast; and a third communications connection to a second base station having a second coverage area, the third connection for sending the first media content from the processing system to the second base station for transmission to the user through unicast while the user is within the second coverage area.

Figure 2:
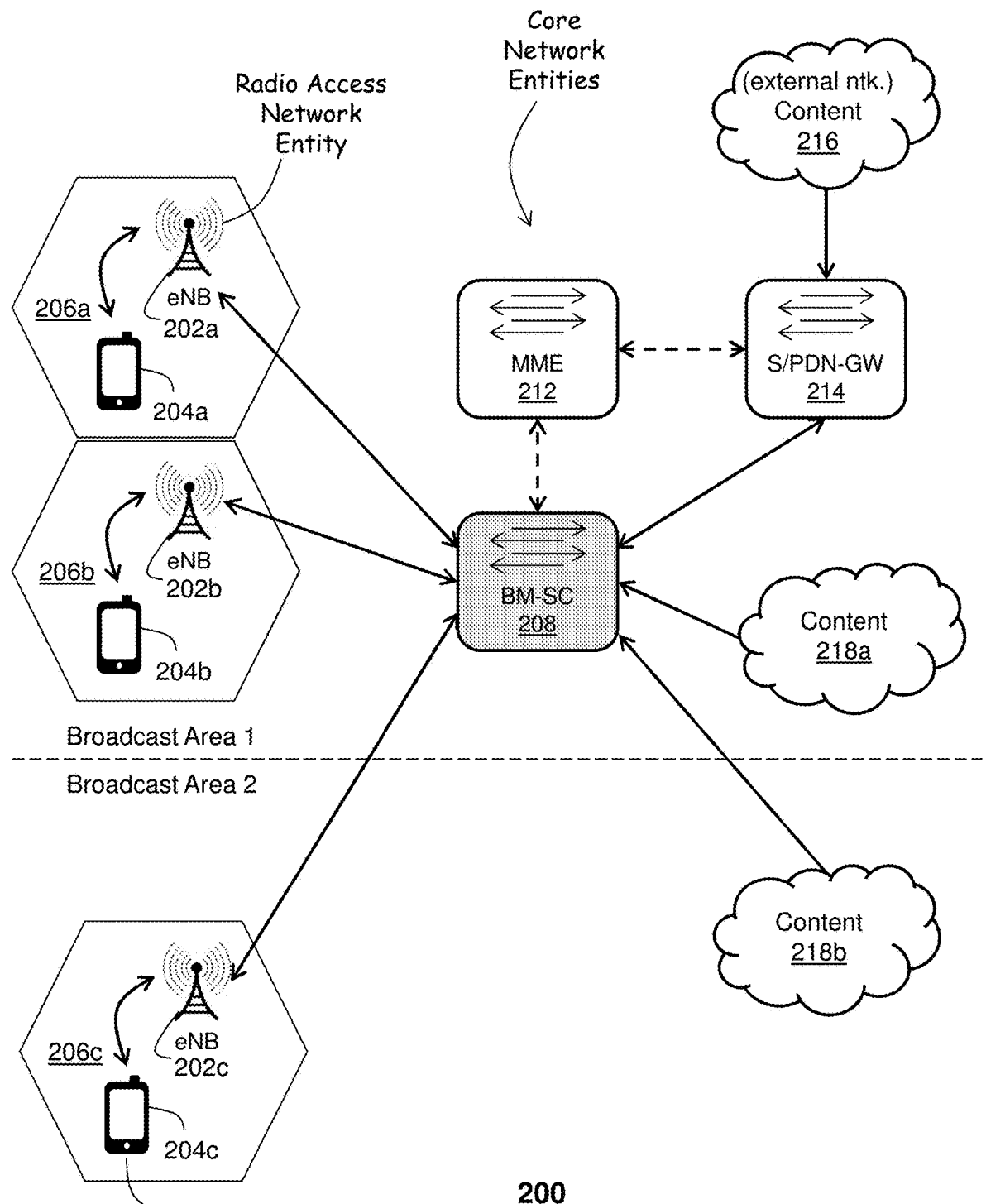
FIG. 2 depicts an illustrative embodiment of a system utilizing certain aspects of the exemplary embodiments.

Referring to FIG. 2 an illustrative embodiment of a portion of a wireless network 200 according to certain aspects of the disclosure is shown. The wireless network 200 may include a number of eNBs 202a . . . 202c, generally 202, and other network entities. An eNB 202 may be a tower, or base station, that communicates wirelessly with mobile devices 204a . . . 204c, generally 204. Each eNB 202 can provide communication coverage for a particular geographic area 206a . . . 206c, generally 206. In at least one embodiment, the network 200 may include a Broadcast Multicast Service Center (BM-SC) 208, at least one MME 212, and a combined S/PDN-GW 214. In an LTE network, the term "cell" can refer to a coverage area of an eNB and/or an eNB subsystem serving this coverage area.

An eNB 202 can provide communication coverage for a macro cell, a pico cell, a femto cell, and/or other types of cells. A macro cell may cover a relatively large geographic area (e.g., several kilometers in radius) and may allow unrestricted access by mobile devices 204, sometimes referred to as User Equipment (UE). A pico cell may cover a relatively small geographic area and may allow unrestricted access by UEs 204. A femto cell may cover a relatively small geographic area (e.g., a home or business) and may allow restricted access by UEs 204 having association with the femto cell. In general, an eNB can support one or multiple cells.

The wireless network 200 can be a heterogeneous network that includes eNBs of different types, e.g., macro eNBs, pico eNBs, femto eNBs, relays, etc. These different types of eNBs can have different transmit power levels, different coverage areas, and different impact on interference in the wireless network 200. For example, macro eNBs can have a high transmit power level (e.g., about 20 Watts) whereas pico eNBs and femto eNBs may have a lower transmit power level (e.g., about 1 Watt or less depending on indoor/outdoor cells and their coverage area).

The eNBs 202 can also communicate with one another, e.g., directly or indirectly via wireless or a backhaul network (not shown). The backhaul network can be various types of networks, such as a private network (e.g., owned, operated, and/or leased on behalf of a wireless communication service provider) and/or a public network (such as a packet switched network, e.g., the Internet, or a circuit-switched network). The backhaul network can include various types of connections including one or more of wireline connectivity, fiber optic connectivity, and wireless connectivity. Wireless connectivity can include, without limitation, one or more of a terrestrial radio link, a microwave link, a free-space optical link, a satellite link, and so on.

The UEs 204 can be dispersed throughout the wireless network 200, and each UE 204 may be stationary or mobile. A UE 204 can also be referred to as a terminal, a mobile station, a subscriber unit, a station, mobile entity, or other terminology. A UE 204 can be a cellular phone, a personal digital assistant (PDA), a wireless modem, a wireless communication device, a handheld device, a laptop computer, a cordless phone, or other mobile entities, such as a vehicle. In some embodiments, the UE 204 can include otherwise fixed or stationary equipment, such as a media processor or set-top box, a web-enabled appliance, a utility meter, an Internet of Things (IoT) device, and the like. A UE 204 can be able to communicate with the eNBs 202, whether macro eNBs, pico eNBs, femto eNBs, or other network entities.

In some embodiments, the BM-SC 208 may receive data, or media, for forwarding by way of the mobile user service from a number of external content sources 218a and/or 218b. Alternatively or in addition, the BM-SC 208 receives data for forwarding by way of the mobile user service from another content source 216, by way of the S/PDN-GW 214.

In some embodiments, the BM-SC 208 may receive data, or media, for forwarding by way of traditional radio, television, or other broadcasts. Alternatively or in addition, the media, may be received over a network, such as a video or audio streaming connection or service. For example, the BM-SC 208 may receive data, or media, for forwarding by way of traditional broadcast from external content source 218a, as it is shown located in Broadcast Area 1, which is served by external content source 218a. In some embodiments, even where a particular BM-SC 208 is located in a broadcast area served by a particular external content source 218, that BM-SC 208 may receive data, or media, for forwarding by way of a streaming, or other, network connection. In still another embodiment, the BM-SC 208 may receive data, or media, for forwarding by way of a combination of traditional broadcast and a streaming, or other, network connection from external content source 218a.

As shown in FIG. 2, the BM-SC 208 is outside of Broadcast Area 2, which is served by external content source 218b. Thus, the BM-SC 208 may receive data, or media, for forwarding by way of a streaming, or other, network connection from external content source 218b. In some embodiments, the BM-SC 208 may receive data, or media, for forwarding by way of traditional broadcast from external content source 218b, through equipment (not shown) located in Broadcast Area 2 with a direct or indirect connection to the BM-SC 208, such as a streaming, or other, network connection. Thus, it can be seen that the BM-SC 208 may get media content, or other data, from a number of different sources 216 and 218 through any combination of traditional broadcast, network connections, such as a private network or the Internet, or other direct or indirect connections.

UE 204a may receive data and/or media content directly from external content source 218a, such as through traditional broadcast from external content source 218a, while it is in Broadcast Area 1, which is served by external content source 218a. However, as discussed above, traditional broadcast has limitations. Thus, in one or more exemplary embodiments, UE 204a may also, or alternatively, receive data and/or media content indirectly from external content source 218a, through BM-SC 208 and eNB 202a, while in geographic area 206a using an evolved Multimedia Broadcast/Multicast service (eMBMS) connection.

Because UE 204b is near the border of, but outside, Broadcast Area 2, it may or may not be able to receive data and/or media content directly from external content source 218b, such as through traditional broadcast from external content source 218b. However, in one or more exemplary embodiments, UE 204b may receive data and/or media content indirectly from external content source 218b, through BM-SC 208 and eNB 202b, while in geographic area 206b using an eMBMS connection. Thus, the network 200, or portions thereof, may make content from content sources 216 and 218 available within areas normally served by such sources 216 and 218, as well as areas near or bordering the areas normally served by such sources 216 and 218, through a multi-cast, or eMBMS, connection to the user equipment 204.

Because UE 204a is further from the border of Broadcast Area 2, as shown in FIG. 2, UE 204a may not be able to receive data and/or media content (or receive data and/or media content of a sufficient quality above a quality threshold) directly from external content source 218b through traditional broadcast from external content source 218b. However, UE 204a may receive data and/or media content indirectly from external content source 218*b*, through BM-SC 208 and eNB 202*a*, while in geographic area 206*a* using an eMBMS connection. This is because, in one or more embodiments, the network 200, or portions thereof, may make content from content sources 216 and 218 available outside areas normally served by such sources 216 and 218 through a multi-cast, or eMBMS, connection to the user equipment. For example, the network 200 may make popular media content, or other data, widely available over multi-cast, or eMBMS. This would permit a user to drive across an entire region, or country, listing to a popular radio station that, itself, broadcasts to only a limited local area, such as the user's home town.

There are a wide variety of business cases for operators around the globe utilizing such a high-speed mobility based broadcast solution. These may vary from one operator to another depending on their network ecosystem. By way of non-limiting example, the embodiments disclosed herein can be used for broadcast and/or multicast (such as eMBMS) of standard service provider offerings, such as electronic programming guides, regularly scheduled programming, e.g., network programming, live programming Service regions can include, without restriction, national, regional and/or local broadcasts/multicasts. It is also envisioned that service can be provided to one or more venues, such as arenas, stadiums, theaters, businesses, college campuses, and the like. In at least some embodiments, the BM-SC network entity 208 has access to a database or similar provisioning repository. The BM-SC 208 can identify a MBMS target distribution region, e.g., from a data service request. The BM-SC 208 can access the provisioning database and/or mapping server to associate core network elements and/or radio access nodes servicing the target distribution region. The techniques disclosed herein can be used to establish a point-to-multipoint data delivery service by way of one or more BM-SCs 208, based on the corresponding core network elements and/or radio access nodes.

In some embodiments, data delivered by the MBMS service is streaming data, or media, as in streaming video (e.g., MPEG), streaming audio (e.g., MP3) and the like. Streaming data can include, without limitation, one or more of SD, HD and Ultra HD, e.g., 4K TV format. Alternatively or in addition, the data is non-streaming data, e.g., data files. Such non-streaming data can include, without limitation, programs files, e.g., operating systems and/or applications, updates to operating systems and/or applications, antivirus software and/or supporting files, image files, text files, and so on.

The data delivered by the MBMS service can additionally, or alternatively, be delivered via more traditional unicast data connections through the eNBs 202 to the UE 204. For example, one with ordinary skill in the art would recognize that the bandwidth available, even on eMBMS, is limited, and that with current technology, a network would not be able to make all broadcast content from all radio stations available all across the entire United States, for example. One with ordinary skill in the art would also recognize that there may be little demand in Portland, Oreg. for a local radio program from Portland, Me., for example. That is, except to someone from Portland, Me., who may happen to be visiting Portland, Oreg. Thus, the network 200 need not make all broadcast content from all radio stations available all across the entire United States through eMBMS. Rather, for that user visiting Portland, Oreg. from Portland, Me., for example, the network 200 can establish a unicast connection and provide that user with media content or other data far from where that content is normally broadcast, or otherwise made available.

For example, referring to FIG. 2, because UE 204*c* is far from Broadcast Area 1, UE 204*c* cannot receive data and/or media content directly from external content source 218*a* through traditional broadcast from external content source 218*a*. However, UE 204*c* may receive data and/or media content indirectly from external content source 218*a*, through BM-SC 208 and eNB 202*c*, while in geographic area 206*c* using a unicast connection.

Thus, it can be seen that users of UE 204*a* and UE 204*b* can receive media content, or other data, from sources 216 or 218*a* over multi-cast, or eMBMS, while in Broadcast Area 1, an area normally served by those sources (although utilizing different technology). When a user travels away from the area normally served by sources 216 or 218*a*, such as the user of UE 204*c*, they can still receive media content, or other data, from those sources over a unicast connection to the network 200. As will be explained further below, the transition between multi-cast, or eMBMS, and unicast can occur seamlessly to the user as they travel between geographical areas.

One with ordinary skill in the art should recognize the many efficiencies the present disclosure including the exemplary embodiments realize. For example, available unicast connection bandwidth is preserved, as multi-cast, or eMBMS, may be used to make media content, or other data, available where it is popular and/or local. Second, available multi-cast, or eMBMS, connection bandwidth is preserved, as unicast connections may be used to make media content, or other data, available where it is less popular and/or not local.

Additional efficiencies should be apparent to one with ordinary skill in the art having benefit of this disclosure. For example, even where selected content is available for multi-cast from a specific eNB 202, the system may recognize that few UEs 204 are currently requesting that media content and utilize unicast connections to transmit the requested content to those UEs 204. This can work the other way as well, such that the system may recognize that many UEs 204 have requested media content over unicast connections in a given area 206, and switch those users to multi-cast from the eNB 202 serving that area. In this manner, the system can balance loads between unicast and multi-cast, as network conditions and demand changes.

Figure 3:
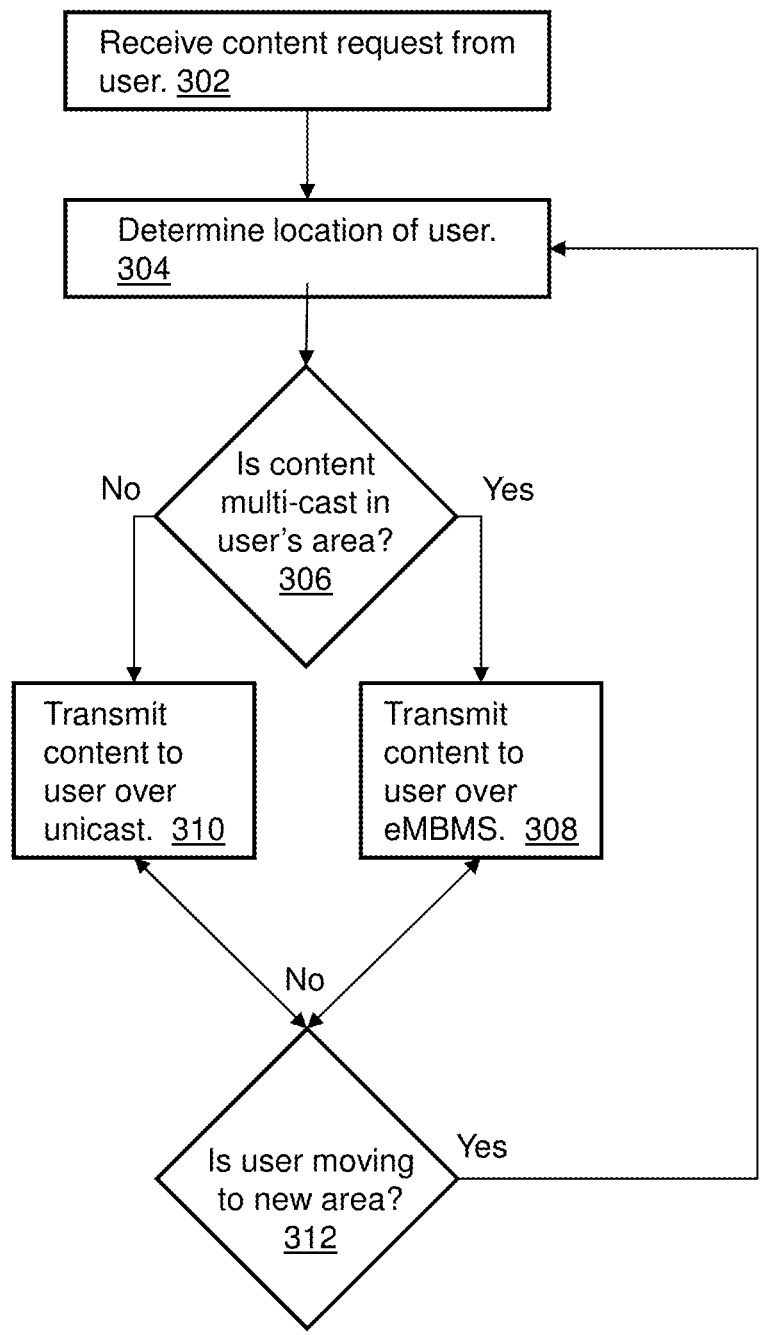
FIG. 3 depicts an illustrative embodiment of a method used in portions of the system described in FIG. 2.

Referring now to both FIG. 2 and FIG. 3, a user, desirous of content such as a radio or television program, from a selected source 218, sends a request for such content to the network 200. The system of one or more exemplary embodiments receives the request, as shown in step 302. The system, or portions thereof, determines where the user is, as shown in step 304. This determination may be made a number of ways, such as including location data in the request. The system, or network 200, may know which eNB 202 is communicating with the UE 204, and therefore knows the user's geographical area 206.

The system then determines if the requested content is available for multi-cast, or eMBMS, transmission to the user's geographical area 206, as shown in step 306. If the requested content is available for multi-cast, or eMBMS, transmission to the user's geographical area 206, the system establishes a multi-cast, or eMBMS, connection between the user's UE 204 and the eNB 202 serving their geographical area 206, as shown in step 308. More precisely, suppose UE204*a* is requesting content from source 218. Since UE 204*a* is in geographical area 206*a*, a multi-cast, or eMBMS, connection is established between UE 204*a* and eNB 202*a* serving geographical area 206*a*, and the requested data is transmitted from eNB 202*a* to UE 204*a* via multi-cast, or eMBMS.

If the requested content is not available for multi-cast, or eMBMS, transmission to the user's geographical area 206, the system establishes a unicast connection between the user's UE 204 and the eNB 202 serving their geographical area 206, as shown in step 310. For example, suppose UE204*c* is requesting content from source 218. Since UE 204*c* is in geographical area 206*c*, a unicast connection is established between UE 204*c* and eNB 202*c* serving geographical area 206*c*, and the requested data is transmitted from eNB 202*c* to UE 204*c* via unicast.

As long as the UE 204 remains in the same geographical area 206 served by the eNB 202 to which it is currently connected, the requested content may be transmitted in the same manner, whether that be eMBMS or unicast, as described above.

One or more of the exemplary embodiments recognize and operate based on people and their devices often being mobile. Therefore, the UE's location may be monitored as it receives the requested content. For example, in one or more embodiments, the system may continuously, or periodically, monitor the location of the UE 204 to determine if the UE 204 is moving outside of the geographical area 206 served by the eNB 202 to which it is currently connected, as shown in step 312. If the UE 204 is moving to a new geographical area 206, the system re-determines the user's location, or anticipated movement, as shown in step 306, repeating the remainder of the method as needed. This process of monitoring and accounting for mobility of the user may occur, for example, as part of a traditional hand-off between cell towers as a user moves between cells, or utilize a similar process.

If the UE 204 is moving to a geographical area 206 not served by the eNB 202 to which it is currently connected, the system determines if the requested content is available for multi-cast, or eMBMS, transmission to the new geographical area 206. If the requested content is available for multi-cast, or eMBMS, transmission to the new geographical area 206, a new multi-cast, or eMBMS, connection is established between UE 204 and the eNB 202 serving the new geographical area 206, as shown in step 308, and the requested data is transmitted from the new eNB 202 to UE 204 via multi-cast, or eMBMS. Specifically, as the user moves from geographical area 206*a* to geographical area 206*b*, their UE 204 negotiates and establish a new multi-cast, or eMBMS, connection to eNB 202*b*, serving geographical area 206*b*.

If the requested content is not available for multi-cast, or eMBMS, transmission to the new geographical area 206, the system establishes a unicast connection between the user's UE 204 and the eNB 202 serving the new geographical area 206, as shown in step 310, and the requested data is transmitted from the new eNB 202 to UE 204 via unicast. Specifically, as the user moves from geographical area 206*b* to geographical area 206*c*, their UE 204 negotiates and establish a unicast connection to eNB 202*c*, serving geographical area 206*c*.

As mentioned, the transition, or hand-off, is done behind the scenes. The system of one or more exemplary embodiments also makes the determination described in connection with step 306, and establishes the appropriate type connection, as described in steps 308 and 310.

FIG. 3 depicts an illustrative embodiment of a method used by the system of one or more of the exemplary embodiments described herein. While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It can be appreciated that media content, such as radio, television, and even streaming audio/video, often contains advertising content. It can also be appreciated that much of that advertising content is geographically specific. For example, an advertiser in Portland Me. may not want the commercials they paid for to be transmitted to Portland Oreg., following an example from above.

Thus, in one or more exemplary embodiments, the system may detect advertising content within media content, and replace the detected advertising content with more appropriate advertising content. For example, for the user in Portland Oreg. listening to a radio station from Portland Me., the system, or a portion thereof, may remove or otherwise strip advertising content out of the media content transmitted to that user, and replace it with advertising content more relevant to Portland Oreg. More specifically, as described above with reference to FIG. 2, the UE 204*c* may be receiving media content from content source 218*a* over a unicast connection to eNB 202*c*. The system of one or more embodiments receives that media content from content source 218*a* with advertising relevant to Broadcast Area 1, removes that advertising relevant to Broadcast Area 1, replaces it with advertising relevant to Broadcast Area 2, and transmits media content received from content source 218*a* to the UE 204*c* over a unicast connection to eNB 202*c* with advertising relevant to Broadcast Area 2.

This also allows even more targeted advertising. For example, rather than merely replacing advertising across the country, the system may do so across town or other regional boundaries. Specifically, with reference to FIG. 2, the user of UE 204*a* may request to listen to a specific country music station that is being multi-cast from eNB 202*a*, while in area 206*a*. While in area 206*a*, the media is transmitted to UE 204*a* with first advertising content relevant to area 206*a*. As the user of UE 204*a* moves into area 206*b*, and connects with eNB 202*b*, the system continues to transmit the selected country music station, but with different, second advertising content relevant to area 206*b*.

The system need not replace each and every advertisement within the advertising content, within the media content. Rather, the system may replace only selected portions of the advertising content. These decisions may be based on a variety of factors, such as the time of day. For example, rather than replacing all of the first advertising content relevant to area 206*a*, as the user of UE 204*a* moves into area 206*b*, the system may recognize that it is lunch time and replace only an advertisement for a restaurant in area 206*a* with an advertisement for a restaurant in area 206*b*. In this manner, the system may target the user with advertising content relevant not only to their location but other factors as well, such as time of day. Various techniques can be utilized for managing targeted advertising including accessing metadata that indicates characteristics of particular advertisements and/or accessing metadata that indicates characteristics of particular content being delivered to facilitate removal and/or replacement of advertising that is targeted to the particular user and/or particular mobile device.

Advertisers and/or content sources 216 and 218 may be given the choice whether any or all of their advertising content may be replaced as described. Furthermore, advertisers and/or the content sources 216 and 218 may be given (or sold) user consumption data identifying, for example, the popularity of specific media content in each geographical area. Such information may be generic across all users, or may be specific to groups or individual users. Such information may be subject to opt-in and opt-out provisions of the users.

UEs 204, in proximity to one another, may share bandwidth. For example, a first user in a vehicle may be utilizing UE 204a to receive audio-only media content over a first unicast connection. A second user in the vehicle may use UE204b to receive video media content over a second unicast connection. In this, or similar, scenario, UE 204a may have available bandwidth while UE 204b struggles to deliver quality video. This may be due to the fact that UE 204a's audio-only media content requires less bandwidth, or UE 204a has a better connection to the network 200, or some other reason. In order to provide the second user with an improved or best quality of service (QoS) possible, UE 204a may additionally receive portions of the video media content over its first unicast connection and then share those portions of the video media content with UE 204b for presentation to the second user, over a third connection between UE 204a and UE 204b, such as WiFi, USB, Bluetooth, or a wired connection. In this manner UE 204a and 204b may pool and share bandwidth, or network capacity. Any number of UE's 204 can be utilized for this purpose and the roles of the different UE's 204 can vary, including receiving one or more of audio, video, data, control signals, metadata, etc.

Other embodiments and features are possible. For example, rather than selecting specific content, the user may instead select a type or genre of content, with the system of one or more of the exemplary embodiments selecting the specific content, matching the selected type or genre. In this manner, the system may utilize available multi-cast resources without needing to establish and utilize unicast connections. Specifically, with reference to FIG. 2, the user of UE 204a may request to listen to country music while in area 206a. In that case, the system, or a portion thereof, would select a country music station that is being multi-cast (or made available for multi-cast) from eNB 202a. As the user of UE 204a moves into area 206b, and connects with eNB 202b, the system continues to transmit content of the country music station that the system (not the user) selected, presuming the content is also being multi-cast (or made available for multi-cast) from eNB 202b. As the user of UE 204a moves into area 206c, and connects with eNB 202c, the system recognizes that the country music station that it previously selected is not being multi-cast (or made available for multi-cast) from eNB 202c, and selects and transmits another country music station that is being multi-cast from (or made available for multi-cast) from eNB 202c.

Furthermore, in one or more exemplary embodiments, switching between base stations and/or switching between multi-cast and unicast may be based, at least in part, on network conditions and/or demand for the particular media content. For example, as demand for a particular media from a particular base station goes up and/or, as that particular base station runs low on unicast channels, that particular base station may switch to multi-cast that particular media content, thereby consolidating those users who were previously receiving that content over a plurality of unicast channels onto one multi-cast channel. Transitioning from unicast to multi-cast, or vice versa, may also be performed to avoid poor signal conditions or Quality of Service (QoS) on multi-cast or unicast channels.

In some embodiments, the user may be transitioned from multi-cast to unicast, and back to multi-cast, as the user travels through multiple coverage areas. The reverse is also true, such that the user may be transitioned from unicast to multi-cast, and back to unicast, as the user travels through multiple coverage areas. These and other transitions described above may be controlled or determined in a centralized fashion, such as by the BM-SC 208, MME 212, or a control server attached thereto. In other embodiments, these and other transitions described above may be controlled or determined in a distributed fashion, such as at the eNBs 202.

Furthermore, in some embodiments, a particular eNB 202 may not receive the media content directly from the BM-SC 208, or MME 212. Rather, a particular eNB 202 may receive the media content another eNB 202, or other source, such as directly from a traditional television or radio broadcast source.

One or more exemplary embodiments can include hybrid approaches. For example, the user may select specific content in their home area for multi-cast (via eMBMS). When that user travels to an area where that specific content is not multi-cast, the system may recognize the type or genre of the selected content and transmit over multi-cast other content of the recognized type or genre. Specifically, with reference to FIG. 2, the user of UE 204a may request to listen to a specific country music station that is being multi-cast from (or made available for multi-cast) from eNB 202a, while in area 206a. As the user of UE 204a moves into area 206b, and connects with eNB 202b, the system continues to transmit the selected country music station, presuming it is also being multi-cast from (or made available for multi-cast) from eNB 202b. As the user of UE 204a moves into area 206c, and connects with eNB 202c, the system recognizes that the selected country music station is not being multi-cast from (or made available for multi-cast) from eNB 202c, and selects and transmits another country music station that is being multi-cast from (or made available for multi-cast) from eNB 202c.

This could be done with or without user prompts. For example, with reference to the immediately preceding example, before the system transitions to the country music station being multi-cast from eNB 202c, the system may prompt the user to choose between 1) switching to another country music station available on multi-cast or 2) continuing to transmit the selected country music station through a unicast connection. In one or more embodiments, the user may make this choice ahead of time, through selecting user preferences or otherwise preconfiguring their UE 204.

Figure 4:
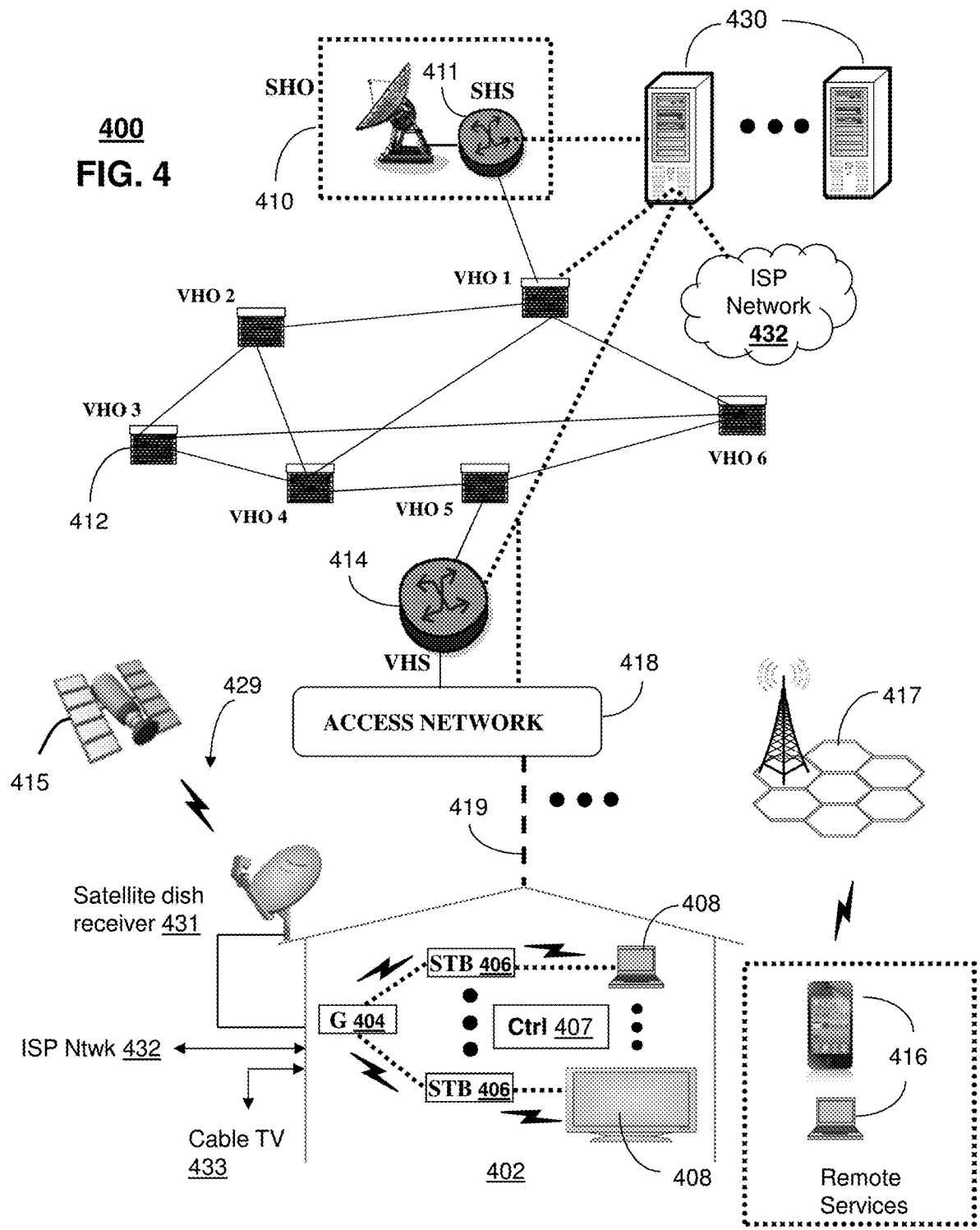
FIGS. 4-5 depict illustrative embodiments of communication systems that may provide media content and services for use with the system described in FIG. 2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the system of FIG. 2 as another representative embodiment of communication system 400. For instance, one or more devices illustrated in the communication system 400 of FIG. 4 may receive first media content from first equipment of a first source, transmit the first media content to a first base station having a first coverage area for transmission from the first base station to a user device through multi-cast (e.g. eMBMS) while the user device is within the first coverage area, and/or transmit the first media content to a second base station having a second coverage area for transmission from the second base station to the user device through unicast while the user device is within the second coverage area.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as various devices described herein. The computing devices 430 can use computing and communication technology to perform the functions described above, which can include among other things, the techniques described by method of FIG. 3. For instance, function of server 430 can be similar to the functions described for BM-SC 208, S/PDN-GW 214, content source 216, and/or content source 218. The media processors 406 and wireless communication devices 416 can be provisioned to utilize the services of computing devices 430. For instance, the media processors 406 and wireless communication devices 416 can be the user equipment 204 described able.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
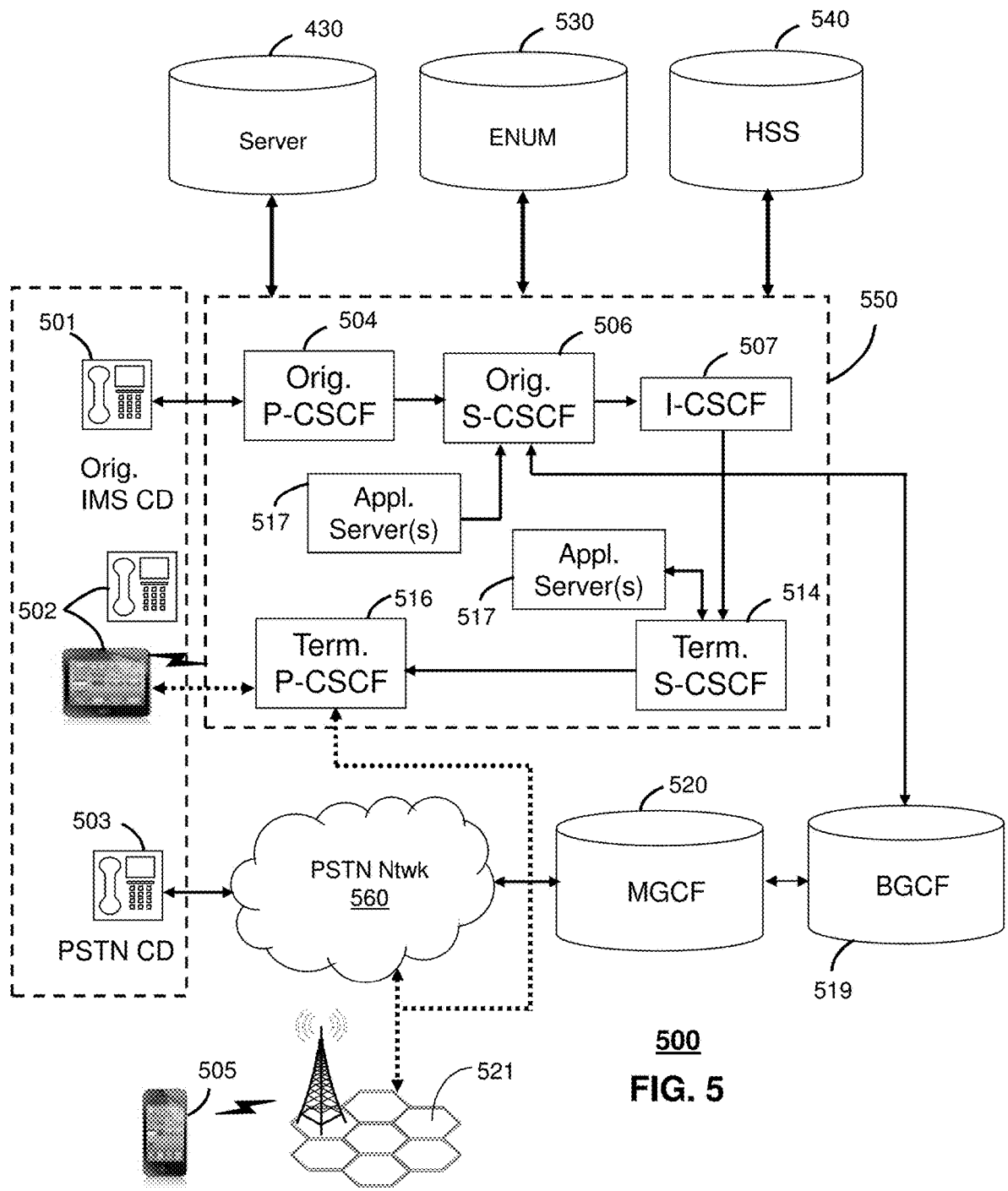

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with network of FIG. 2 and communication system 400 as another representative embodiment of communication system 400. System 500 enables a mobile end user device to transition between a circuit-switched and packet switched environment, such as for preconfiguration of the system.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF

506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 6:
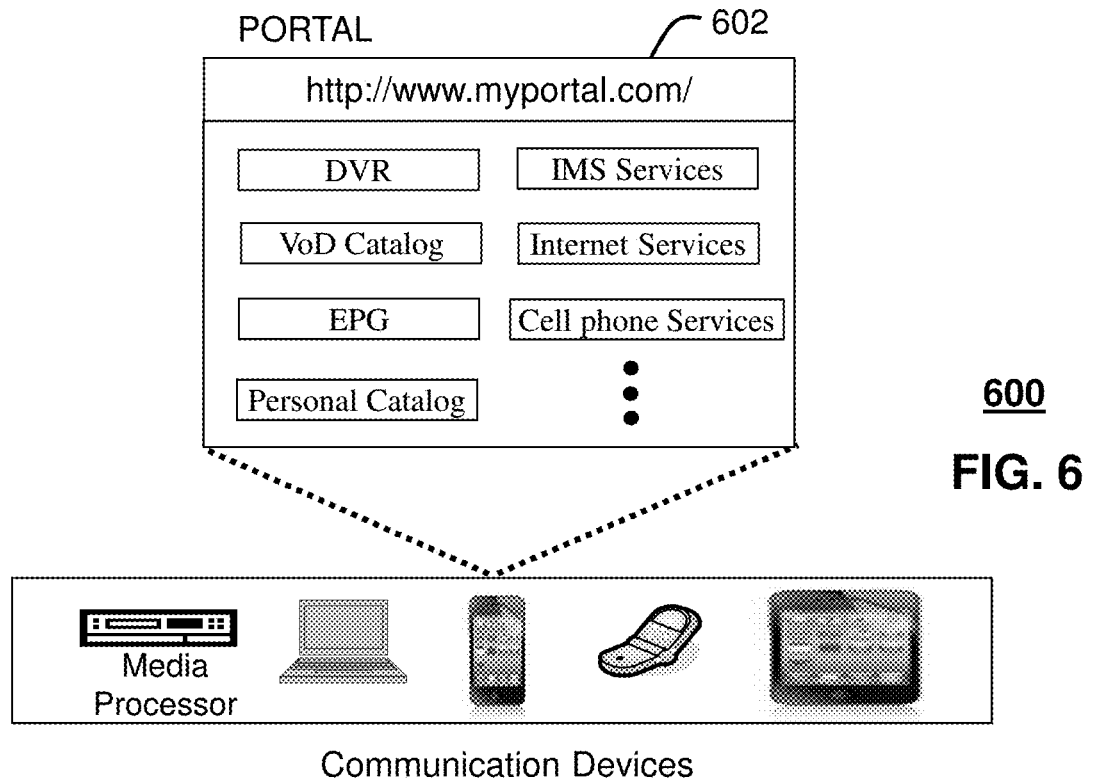
FIG. 6 depicts an illustrative embodiment of a web portal for interacting with the communication systems of FIGS. 2 and 4-5.

FIG. 6 depicts an illustrative embodiment of a web portal 602 of a communication system 600. Communication system 600 can be overlaid or operably coupled with the system of FIG. 2, communication system 400, and/or communication system 500 as another representative embodiment of the system of FIG. 2, communication system 400, and/or communication system 500. The web portal 602 can be used for managing services of the system of FIG. 2 and communication systems 400-500. A web page of the web portal 602 can be accessed by a Uniform Resource Locator (URL) with an Internet browser using an Internet-capable communication device such as the UE 204 described in FIG. 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on. For example, web portal 602 may be used for selecting user preferences or otherwise preconfiguring the UE and/or its interaction with the system.

The web portal 602 can further be utilized to manage and select content as may be desired by subscribers and/or content providers 216 and 218, and communication systems 400-500. For instance, users can log into their on-line accounts and select, and potentially subscribe to, content from source 218, such that the selected content is thereafter available to the user from source 218 for consumption over the network 200, and so on. Service providers can log onto an administrator account to provision, monitor and/or maintain the network 200 or server 430.

Figure 7:
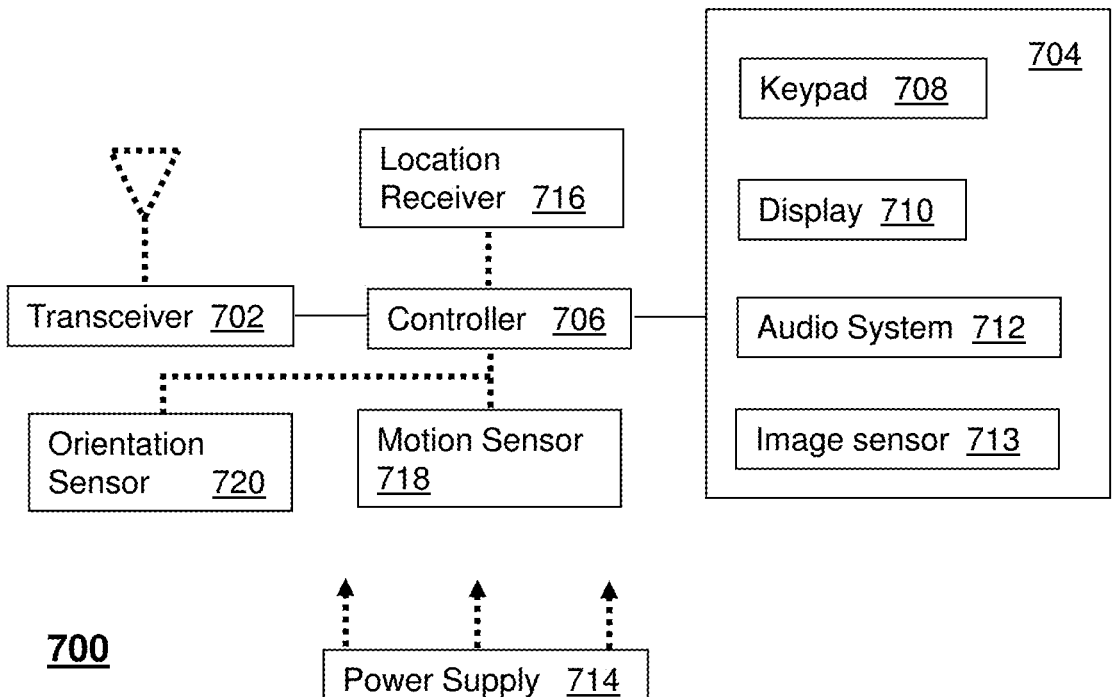
FIG. 7 depicts an illustrative embodiment of a communication device.
Figure 8:
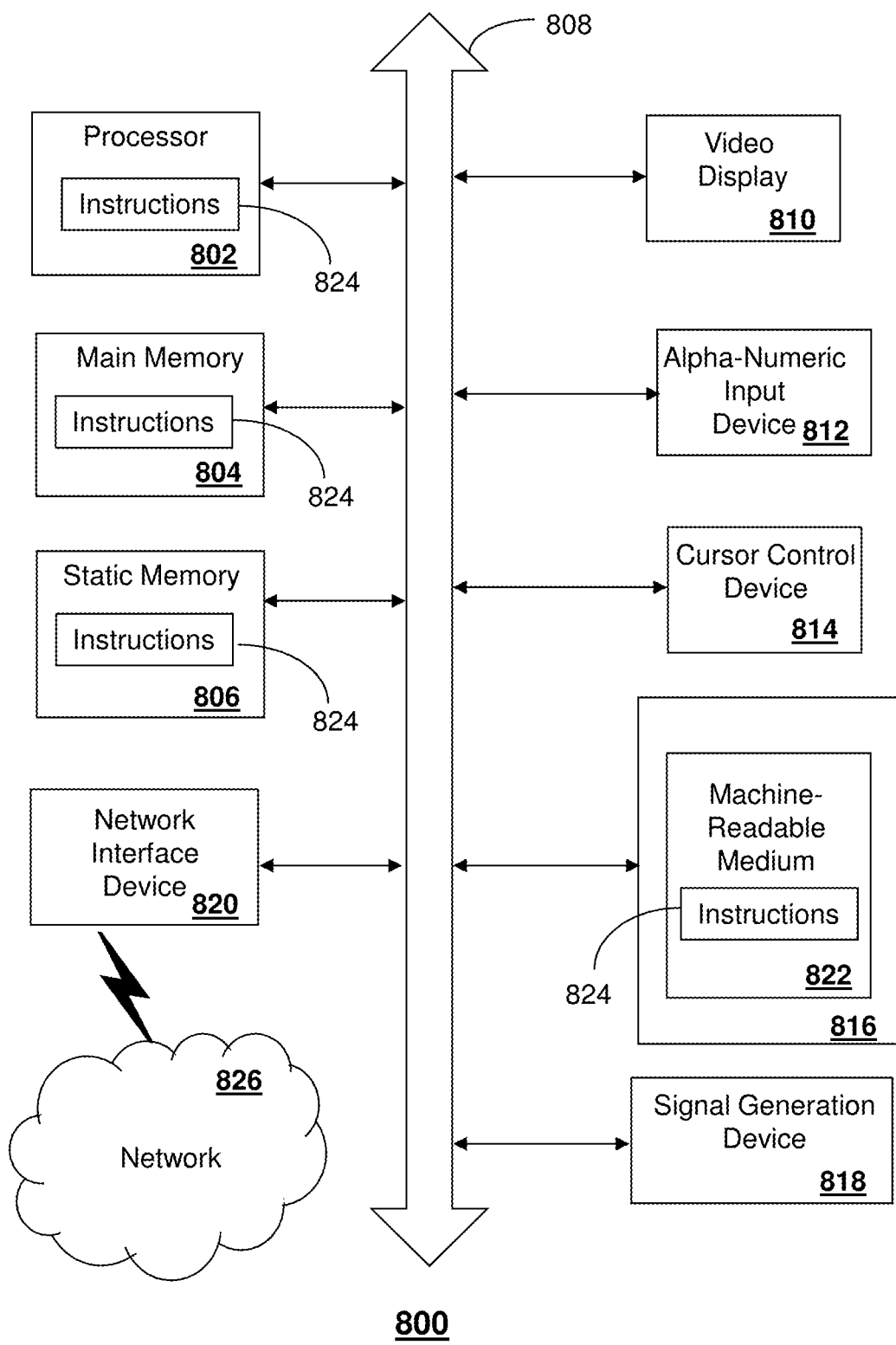
FIG. 8 is a diagrammatic representation of a machine in the form of a computer system within which a set of instructions, when executed, may cause the machine to perform any one or more of the methods described herein.

FIG. 7 depicts an illustrative embodiment of a communication device 700. Communication device 700 can serve in whole or in part as an illustrative embodiment of the user devices 204 depicted in FIG. 2, and FIGS. 4-5 and can be configured to request and receive content, as described in FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of UE 204, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in connection with the network 200, and/or communication systems 400-500 of FIGS. 4-5 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor, a first media content from a first equipment of a first source, wherein the first media content is received by the processing system with a first advertising content;
detecting the first advertising content in the first media content;
detecting a location of a user device;
transmitting, by the processing system, the first media content to a first base station having a first coverage area for transmission from the first base station to a user device by way of an Evolved Multimedia Broadcast Multicast Service (eMBMS) providing a unidirectional point-to-multipoint transmission of data from the first base station to a group of recipients including the user device in a multicast service area corresponding to the first coverage area while the user device is within the first coverage area;
transmitting, by the processing system, the first media content to a second base station having a second coverage area for transmission from the second base station to the user device by way of unicast while the user device is within the second coverage area, wherein the second coverage area is different from the first coverage area, and
selecting, by the processing system, a portion of the first advertising content for replacement in accordance with movement of the user device, wherein the selecting is based at least in part on metadata associated with the first media content, metadata associated with the first advertising content, and a time of day,
wherein the portion of the first advertising content is replaced with a second advertising content obtained via the second base station in accordance with the location of the user device within the first coverage area relative to a border between the first coverage area and the second coverage area, wherein the second advertising content is obtained from a second equipment of a second source, wherein the second advertising content is different from the first advertising content.

2. The method of claim 1, wherein the first media content transmitted from the second base station includes the second advertising content.

3. The method of claim 2, wherein a second media content is associated with the second coverage area.

4. The method of claim 1, further comprising:
detecting when the user device enters the second coverage area;
facilitating establishment of a unicast connection between the second base station and the user device; and
inducing a transition from eMBMS transmission of the first media content from the first base station to unicast transmission of the first media content from the second base station.

5. The method of claim 1, further including:
receiving, by the processing system, a second media content from a second equipment of a second source;

transmitting, by the processing system, the second media content to the first base station for transmission from the first base station to the user device by way of unicast while the user device is within the first coverage area; and transmitting, by the processing system, the second media content to the second base station for transmission from the second base station to the user device by way of eMBMS while the user device is within the second coverage area.

6. The method of claim 5, wherein the first media content is received with a first advertising content and the second media content is received with a second advertising content, the second advertising content being different from the first advertising content, and wherein the first media content transmitted to the user device by way of unicast from the second base station when the user device moves to the second coverage area includes the second advertising content and the second media content transmitted to the user device by way of unicast from the first base station when the user device is within the first coverage area includes the first advertising content.

7. The method of claim 1, wherein the first media content is:

received, by the processing system, through broadcast from the first equipment of the first source, the first equipment broadcasting the first media content within the first coverage area;

transmitted by the first base station to the user device through eMBMS while the user device is within the first coverage area; and transmitted by the second base station to the user device through unicast while the user device is within the second coverage area.

8. A non-transitory machine-readable medium comprising executable instructions which, responsive to being executed by a processing system including a processor, cause the processing system to perform operations comprising:

requesting a first media content;

facilitating establishment of a unicast connection with a first base station having a first coverage area for reception of the first media content from a first source via the first base station while in the first coverage area, the multicast connection being established by way of an Evolved Multimedia Broadcast Multicast Service (eMBMS) providing a unidirectional point-to-multipoint transmission of data from the first base station to a group of recipients including the processor in a multicast service area corresponding to the first coverage area, the first media content comprising first advertising content;

facilitating establishment of a unicast connection with a second base station having a second coverage area for reception of the first media content from the second base station while in the second coverage area; and selecting a portion of the fast advertising content for replacement in accordance with movement of the processor, wherein the selecting is based at least in part on metadata associated with the first media content, metadata associated with the first advertising content, and a time of day, wherein the portion of the fast advertising content is replaced with a second advertising content obtained from a second source via the second base station in accordance with a location of the processor within the first coverage area relative to a border between the first coverage area and the second coverage area, wherein the second advertising content is different from the fast advertising content.

9. The non-transitory machine-readable medium of claim 8, wherein the fast media content is received with the first advertising content while in the first coverage area and wherein the first media content is received with a second advertising content hide in the second coverage area.

10. The non-transitory machine-readable media of claim 8, wherein the instructions, when executed, further cause the processor to perform operations comprising switching from multicast reception of the first media content from the first base station to unicast reception of the first media content from the second base station when the processor moves from the first coverage area to the second coverage area.

11. The non-transitory machine-readable medium of claim 8, wherein the instructions, when executed, further cause the processor to perform operations comprising:

requesting second media content;

receiving the second media content from the first base station by way of unicast while the processor is within the first coverage area; and receiving the second media content from the second base station by way of multicast while the processor is within the second coverage area.

12. The non-transitory machine-readable medium of claim 11, wherein the first advertising content is associated with the first coverage area, wherein the first media content is received with the first advertising content within the first coverage area and wherein the first media content is received with the second advertising content within the second coverage area.

13. The non-transitory machine-readable medium claim 11, wherein the second media content comprises area-dependent advertising content, wherein the second media content is received with a first advertising content within the first coverage area and wherein the second media content is received with a second advertising content within the second coverage area.

14. A server comprising:

a processing system including a processor; and a memory that stores executable instructions that, when executed by the processing system, facilitate performance of operations, the operations comprising:

obtaining a first media content from a first equipment of a first source via a first communications connection, wherein the first media content comprises a first advertising content;

initiating a second communications connection with a first base station having a first coverage area, wherein the first media content is sent from the processing system via the second communications connection to the first base station for transmission to a user device within the first coverage area by way of an Evolved Multimedia Broadcast Multicast Service (eMBMS) providing a unidirectional point-to-multipoint transmission of data from the first base station to a group of recipients including the user device in a multicast service area corresponding to the first coverage area;

initiating a third communications connection with a second base station having a second coverage area that is different from the first coverage area, wherein the first media content is sent from the processing system via the third communications connection to the second base station for transmission from the second base station to the user device by way of unicast while the user device is within the second coverage area; and selecting a portion of the first advertising content for replacement n accordance with movement of the user device, wherein the selecting is based at least in part on metadata associated with the first media content, metadata associated with the first advertising content, and a time of day, wherein the portion of the first advertising content is replaced with a second advertising content obtained via the second base station in accordance with a location of the user device within the first coverage area relative to a border between the first coverage area and the second coverage area wherein the second advertising content is obtained from a second source, wherein the second advertising content is different from the first advertising content.

15. The server of claim 14, wherein the first media content transmitted from the second base station includes the second advertising content.

16. The server of claim 14, wherein the operations further comprise:
- facilitating establishment of an eMBMS connection between the first base station and the user device while the user device is in the first coverage area, thereby facilitating the transmission to the user device within the first coverage area;
- detecting when the user device enters the second coverage area;
- facilitating establishment of a unicast connection between the second base station and the user device, thereby facilitating the transmission to the user device within the second coverage area; and
- inducing a transition from eMBMS transmission of the first media content from the first base station to the user device within the first coverage area to unicast transmission of the first media content from the second base station to the user device within the second coverage area.

17. The server of claim 14, wherein the operations further comprise establishing, by the processing system, a fourth communications connection to enable obtaining a second media content from a second source, wherein the first base station is further configured for transmitting the second media content from the first base station to the user device through unicast while the user device is within the first coverage area.

18. The server of claim 17, wherein the first media content is obtained with first advertising content and the second media content is obtained with second advertising content, the second advertising content being different from the first advertising content, wherein the fast media content transmitted to the user device through unicast from the second base station when the user device moves to the second coverage area includes the second advertising content, and wherein the second media content transmitted to the user device through unicast from the first base station when the user device is within the first coverage area includes the first advertising content.

19. The server of claim 14, wherein the first comminations connection enables reception of a broadcast of the first media content from the first source within the first coverage area.

20. The server of claim 14, wherein the first media content is obtained by the processing system with a first advertising content, wherein the first media content sent over the third communications connection to the second base station includes a second advertising content, the second advertising content being associated with the second coverage area and different than the first advertising content.

* * * * *

UNITED STATES PATENT AND TRADEMARK OFFICE
CERTIFICATE OF CORRECTION

PATENT NO. : 10,798,625 B2  
APPLICATION NO. : 15/918450  
DATED : October 6, 2020  
INVENTOR(S) : Alexander Viox, Iftekhar Alam and Ming-Ju Ho Page 1 of 1

It is certified that error appears in the above-identified patent and that said Letters Patent is hereby corrected as shown below:

In the Claims

Claim 8, Column 21, Line 41: "unicast" should read --multicast--;

Claim 8, Column 21, Line 57: "fast" should read --first--;

Claim 8, Column 21, Line 63: "fast" should read --first--;

Claim 9, Column 22, Line 5: "fast" should read --first--;

Claim 9, Column 22, Line 8: "hide" should read --while--;

Claim 10, Column 22, Line 9: "machine-readable media" should read --machine-readable medium--;

Claim 18, Column 24, Line 16: "fast" should read --first--; and

Claim 19, Column 24, Line 24: "comminations" should read --communications--.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*